Oct. 1, 1935.  C. S. BRAGG  2,015,705
STEERING MECHANISM
Filed Dec. 7, 1931  4 Sheets-Sheet 2
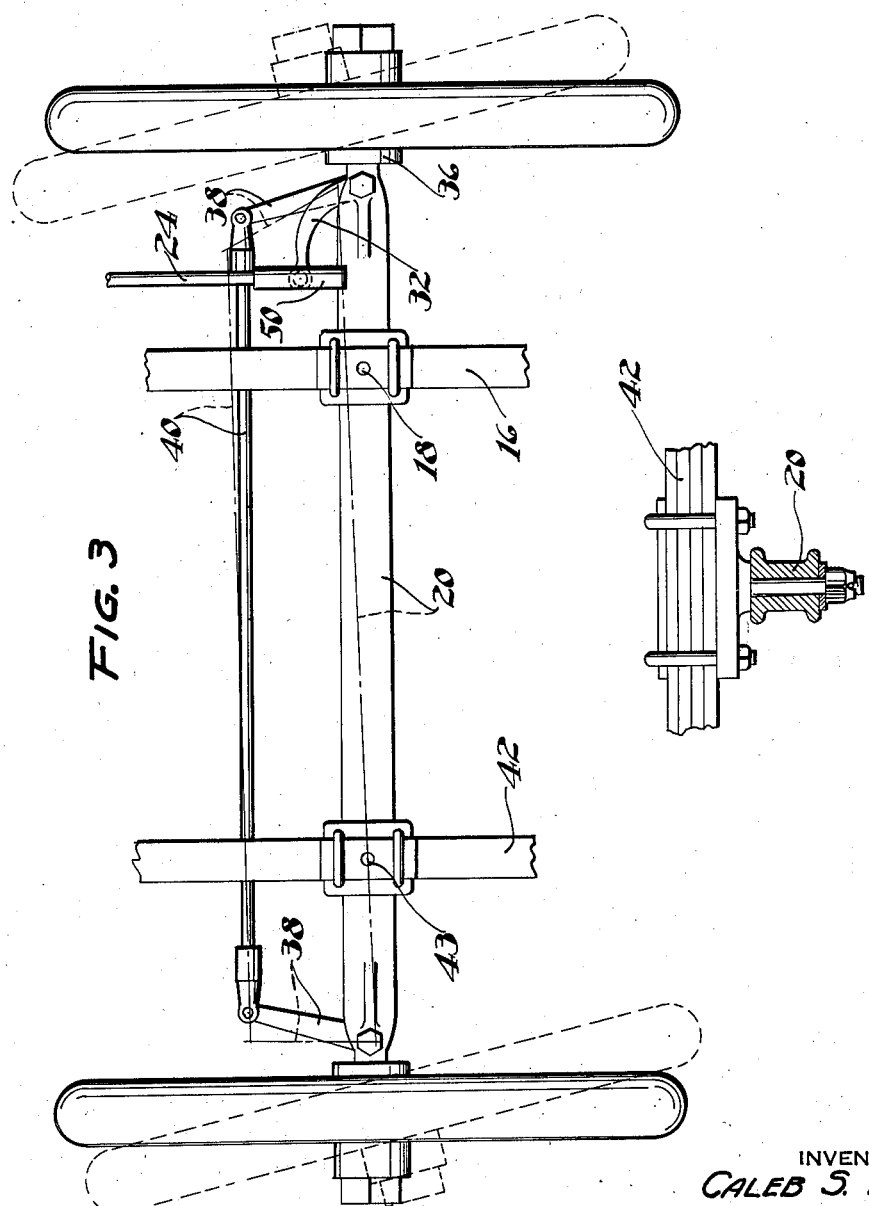
INVENTOR
CALEB S. BRAGG
BY H.O.Clayton
ATTORNEY Oct. 1, 1935.    C. S. BRAGG    2,015,705
STEERING MECHANISM
Filed Dec. 7, 1931    4 Sheets-Sheet 3

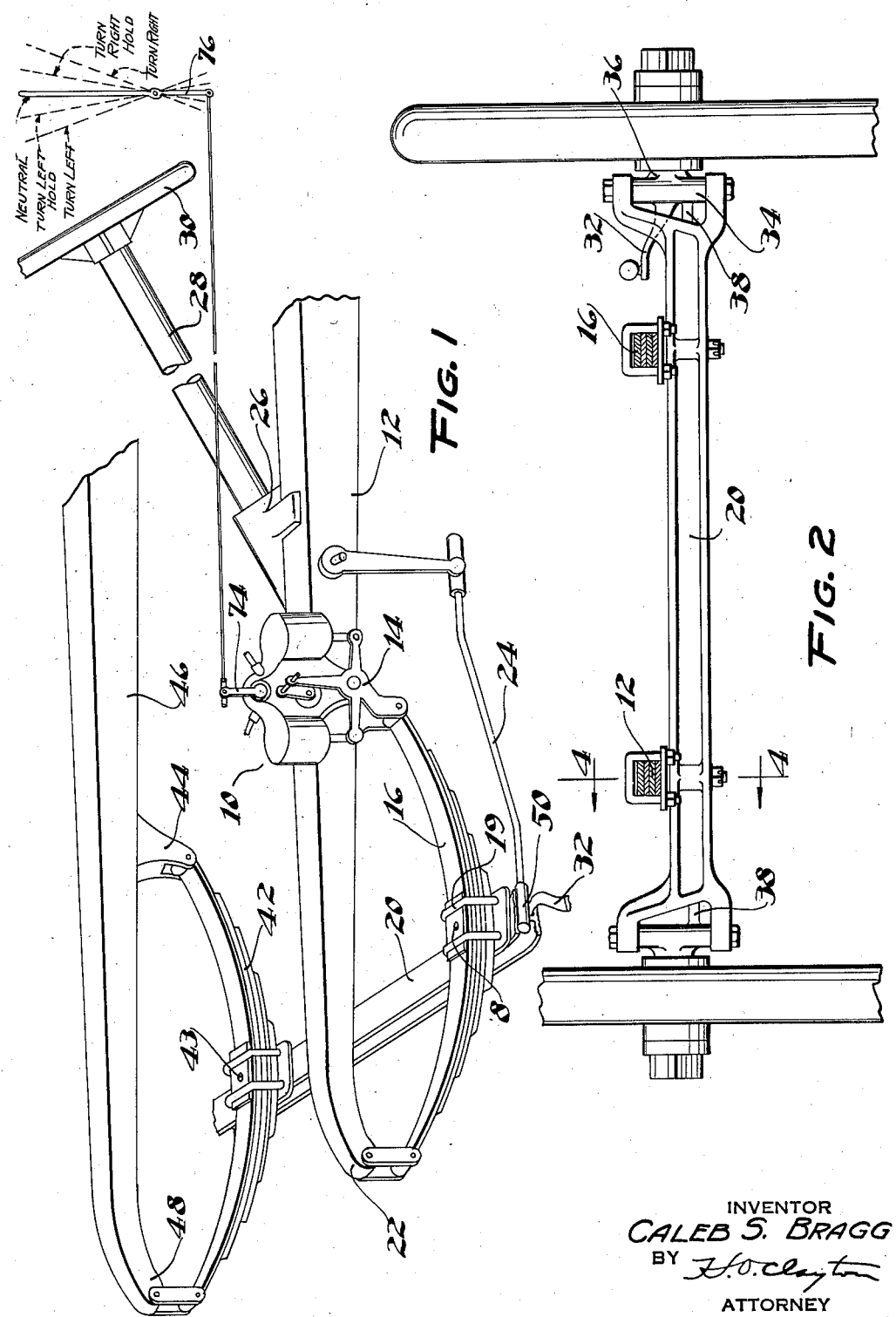

INVENTOR
CALEB S. BRAGG
BY H. O. Clayton
ATTORNEY

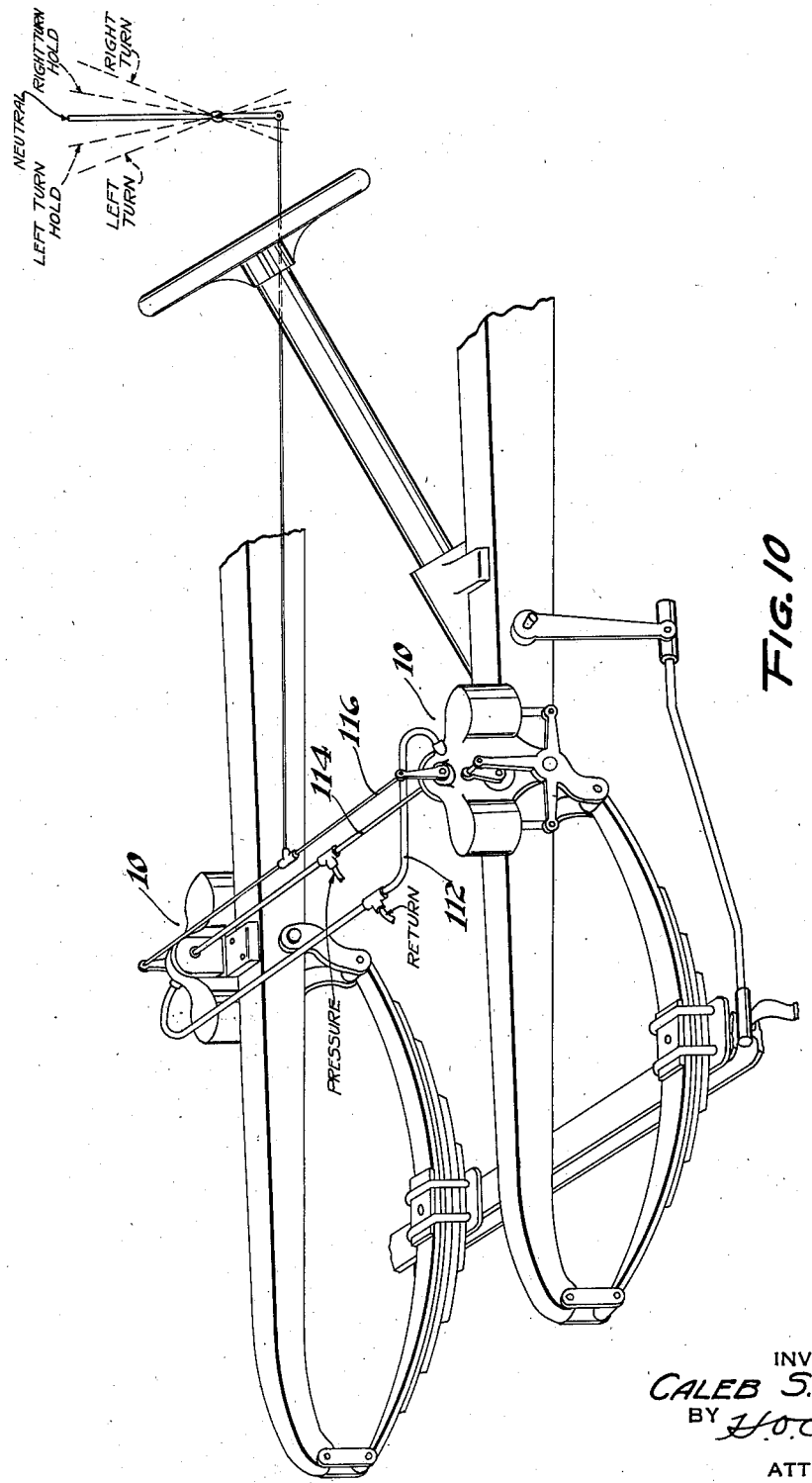

Patented Oct. 1, 1935

2,015,705

UNITED STATES PATENT OFFICE 2,015,705

STEERING MECHANISM

Caleb S. Bragg, Palm Beach, Fla., assignor to Bendix Aviation Corporation, South Bend, Ind., a corporation of Delaware Application December 7, 1931, Serial No. 579,455

26 Claims. (Cl. 180—79.2)

This invention relates to a steering mechanism for vehicles and is applicable particularly to heavy automotive trucks, busses, coaches, and the like, requiring appreciable physical effort in the actuation of the mechanism. The invention is also applicable to the lighter passenger cars, especially those employing the balloon tire, the latter necessitating increased steering effort.

The steering of such automotive vehicles is ordinarily effected by turning the front wheels simultaneously by means of a hand operated wheel controlled by the driver. When the vehicle is passing over a hard smooth roadway and proceeding in a substantially straight direction, the operation of this steering wheel or other manually controlled device does not ordinarily require the exertion of any considerable physical effort on the part of the driver or chauffeur, but in making turns and sudden swerves, especially at slow speed, as in city traffic, the operation of such manually operated devices calls for the exertion of much greater force, even on substantially smooth roads, which produces exhaustion after continuous driving, as in the case of city busses, trucks, etc. In the operation of the vehicle on the rutty or soft roads, or when as very frequently happens, the outer wheels of the vehicle are necessarily turned on to lateral portions of a roadway, which are rutty or soft, a very great amount of force is required for operating the steering mechanism correctly.

However, the steering effort required to determine the direction of the moving vehicle is, at worst, much less fatiguing than the effort required when the vehicle is at rest. Here, we introduce problems of static friction between the many relatively movable parts of the steering mechanism as well as between the tires and the ground, and in general static friction is greater than the purely dynamic friction incurred during motion of the vehicle. For example, with the vehicle parked against a curb, it is usually very difficult to turn the wheels and with the vehicle mired in the mud, the available physical strength to break the hold upon the wheels is usually completely inadequate.

The problem of steering with the vehicle at rest is also aggravated by the increasing practice of carrying more of the pay load upon the front axle of the heavier vehicles, such for example as placing the driver's cab over the motor and so permitting the pay load to be carried several feet nearer the front axle. This practice results in increasing the steering effort beyond the physical strength and endurance of the operator within steering wheel ratios that are practical and safe.

It is, therefore, one of the principal objects of my invention to provide, in connection with the ordinary steering mechanism of such automotive vehicles or any automotive vehicle in which its use may be found advantageous and desirable, a power mechanism for effecting the steering of the vehicle, particularly when the latter is at rest.

It is a further object to place the control of the power mechanism under the positive and delicate control of the operator by means of a manually operated valvular device.

It is a further and even broader aspect of my invention to effect the steering operation, either manually or by power, by movement of the axle with respect to the conventional drag link or its equivalent, the latter remaining stationary to effect the operation. Such relative movement of these parts gives rise to the desired breaking of the static friction as well as the desired steering movement of the wheels.

In the attainment of the above objects, the axle is rendered angularly movable with respect to the stationary drag link and chassis and is preferably power driven, through the intermediary of one of the vehicle springs, by the aforementioned manually controlled power actuator, the latter being preferably hydraulically operated by the force feed lubricating system of the engine.

It is a further object of my invention to effect the relative axle and drag link movement by providing means for bodily moving the front axle forward and rearward with respect to the chassis. To this end there is suggested the provision of one or more power actuators, each of such actuators to be mounted on each of the side rails of the chassis and connected with a spring of the steering axle, the springs acting as force transmitting elements to move the axle.

Further objects of my invention include the provision of a novel secondary valvular cut-off mechanism for automatically rendering the power mechanism inoperative and the provision of the aforementioned manually controlled valvular mechanism so constructed and arranged with the remaining mechanism as to provide selective modes of operation of the axle. Additional objects and meritorious advantages of the invention will become apparent from a reading of the detailed description of the invention in the specifications to follow, taken in consideration with the accompanying drawings in which:

Figure 1 is a perspective of a portion of the chassis together with the essential parts of the steering mechanism constituting my invention;

Figure 2 is a fragmentary front elevation of an automotive vehicle disclosing parts of a conventional steering mechanism;

Figure 3 is a diagrammatic view in plan indicating one mode of operation of my steering mechanism;

Figure 4 is a fragmentary enlargement of the pivotal connection between the front axle and one of the vehicle spring members, the view being taken on line 4—4 of Figure 2;

Figure 10 discloses a modified form of power operating steering mechanism employing a plurality of fluid motors.

Figure 5:
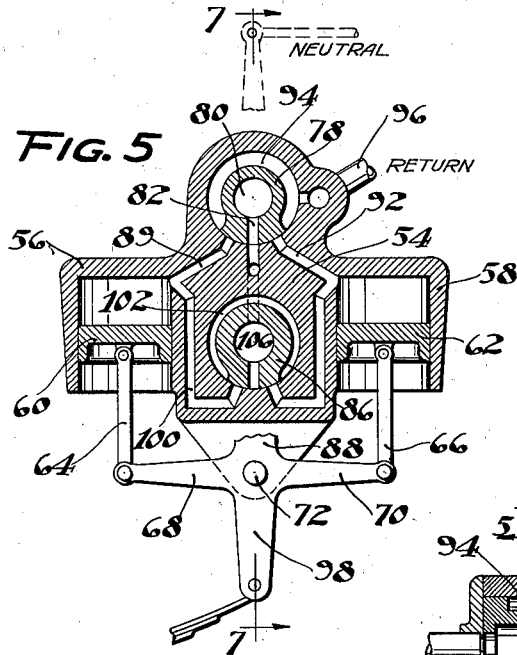
Figure 5 is a longitudinal sectional view through my novel fluid motor taken on line 5—5 of Figure 7.

A preferred embodiment of the invention is shown in its essential details in the perspective of Figure 1. Here there is disclosed a hydraulically operated double acting actuator or power motor 10, rigidly secured to the left side rail or channel 12 of an automotive chassis. The lowermost end of a lever 14, cooperating with the motor 10 and described in greater detail hereinafter, is pivotally secured to the rear end of the left front spring 16, the latter being pivotally mounted at its center 18 upon the front axle 20, Figure 4, and link shackled at its forward end to the extreme end of the side rail or spring horn 22.

The drag link 24 of a conventional steering mechanism is operated in the usual manner through gear box 26 by the steering post 28 and hand wheel 30, the link being connected by the usual steering lever arm 32 with the steering knuckle portion 34 integrally secured to the stub axle 36, the latter parts mounted for swivelling movement around the forked end of the front axle 20. The steering arms 38 of the two front wheels are connected together by the usual tie rod 40 to complete the conventional steering mechanism providing joint operation of the two wheels.

The right front spring 42 is also preferably pivotally mounted at 43 upon the axle 20, and is also pivotally secured at its rear end to a bracket 44, the latter being pivotally secured to the right side rail 46 of the chassis. The left and right springs are link shackled at their forward ends to spring horns 22 and 48.

The steering operation is normally effected by either forward or rearward movement of the drag link 24 with the consequent rotation of the arm 32 and stub axle 36 acting as a lever about the steering knuckle as a fulcrum. The tie rod and remaining connections also provide for simultaneous action of the right wheel. During this operation there is relative movement between the drag link and the axle, the latter remaining stationary.

According to my invention there is suggested the movement of the axle together with its knuckle with respect to the drag link, the latter to remain stationary. To this end, there is provided the aforementioned power operated means 10 for forcing the axle 20 forward or backward on an arc, Figure 3, about its right-hand pivotal connection with the spring 42, the arm 32 fulcruming at its ball and socket connection 50 with the drag link; the axle, at its knuckle, serving to force the stub axle with its left wheel to the left or right in an arc about the fulcrum 50, the latter yielding slightly laterally. The distance from the pivot 43 to the knuckle constitutes a sufficiently great radius to effect an appreciable arcuate lineal movement of the knuckle. The concomitant arcuate lineal movement of the wheel which may be as much as four inches, as it revolves along the latter arc, serves to break the static friction and also possibly impact the contiguous earth if the wheel is mired. With this breaking of the static friction we have the coincident steering effect which is either left or right depending upon the direction of angular displacement of the axle about its pivot 43. The arcuate lineal movement of the right wheel during this phase of the operation is negligible; however, there is a steering effect upon this wheel by virtue of the combined effect of the tie rod and the axle movement.

If desired, a double acting power motor 52, similar to that disclosed on the left side rail, may be positioned on the right side rail to cooperate with the right wheel, as disclosed in Figure 10. With such a structure simultaneous actuation of the motors, in a manner described in greater detail hereinafter, serves to force the axle either bodily forward or backward, and without angular movement with the consequent breaking of the static friction of both wheels due to their forward or rearward progression. The drag link, remaining stationary, cooperates with the moving axle to effect a change in direction or steering effect to both wheels. During this movement, the arm 32 and left stub axle are angularly moved in a manner essentially similar to the heretofore described action of these parts. It is also to be noted that with this mode of operation that the substantial lineal movement of both wheels breaks the static friction on both sides of the vehicle.

The right motor 52 might also be operated to the exclusion of the left motor, in which event the steering effect on both wheels would be negligible, the static friction of the right wheel alone being appreciably broken.

It is to be understood that the various joints in the steering mechanism have sufficient play to insure the above described operations wherein several different centers of curvature impose upon the parts synchronized movement in different arcs.

It is also to be understood that the drag link is to be held perfectly stationary during the heretofore described operations. The irreversible nature of the conventional steering mechanism, such as the worm and worm wheel, will ordinarily suffice to hold the drag link, but as a measure of precaution it is suggested that the operator retain at least a light hold upon the steering wheel.

Figure 6:
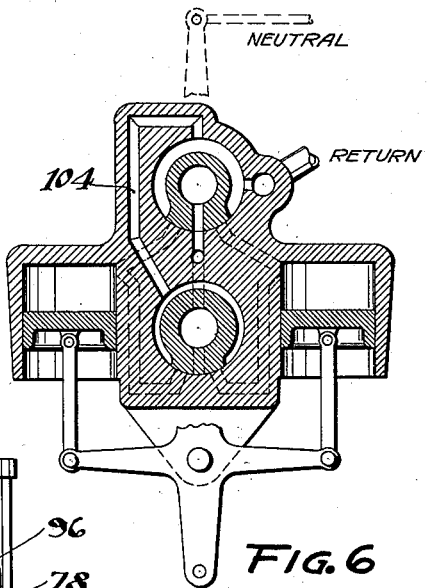
Figure 6 is a view similar to Figure 5 disclosing another longitudinal sectional view taken on line 6—6 of Figure 7.
Figure 7:
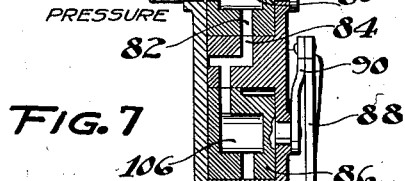
Figure 7 is a transverse sectional view through the motor disclosing in detail the fluid pressure and return conduits which cooperate with the valvular construction.

Means might be provided for manually forcing the springs forward to attain the heretofore described steering effect, but as disclosed, I preferably provide a fluid power motor as a prime mover. In that embodiment selected for illustration, there is disclosed in Figures 5 and 6 a tandem motor construction providing a double acting power source. As disclosed, the casing, which is rigidly secured to the side rail of the chassis, comprises a central portion 54 and left and right side or cylinder portions 56 and 58. Pistons 60 and 62 are connected by rods 64 and 66 to the left and right arms 68 and 70 of the four arm lever member 14, Figure 1, the latter being pivotally mounted at its center upon a pin 72 extended from and rigidly mounted in the side rail or channel member 12.

According to an important feature of my invention, there is provided a manually operated primary valve mechanism for controlling the energization of the motors. A crank 74 rotated by an indexed lever 76, accessible to the driver, serves to actuate a rotary valve member 78 chambered at its center at 80 to receive the oil from the conventional force feed pressure lubricating system of the engine. A duct 82 in the valve member communicates, when the valve is in its neutral position, Figures 5 and 6, with a duct 84 in the casing of the motor, the latter duct communicating with a secondary automatic cut-off rotary valve member 86 located in the lower portion of the motor casing 54. The latter valve member is rotated through the medium of an upwardly extending arm 88 on the lever 14 which actuates a crank 90 secured to the valve member.

In operation, rotation of the indexed lever 76 to the turn left position, Figure 1, serves to rotate the primary or control valve member 78 to bring the duct 82 into registry with a duct 89 leading to the left cylinder 56, thereby energizing the motor with the oil under presure from the engine and moving the piston downwardly. The rotary movement of the primary valve 78 also uncovers a port 92, placing the right cylinder 58 in communication with an opening 94 in the valve member 78, the latter opening communicating with a return 96 leading to the sump of the engine. An unimpeded movement of the right piston 62 is thus permitted, the counterclockwise rotation of the lever 14, under the action of the piston 60, moving the left spring 16 rearwardly by means of the lower lever arm 98 to effect the heretofore described angular movement of the axle 20 and consequent left turn steering effect. The crank 90 is automatically rotated during this latter movement, serving to impart a counter-clockwise movement of the cut-off valve member 86, uncovering a duct 100 to place the cylinder 56 in communication with an opening 102 about the valve member 86, which opening is in communication with a duct 104, Figure 6, in communication with the opening 94 in valve 78 and return 96 to the engine sump. The movement of the piston 60 is thus automatically halted by the action of the cut-off valve 86 in by-passing the pressure fluid to the sump thereby limiting the throw of the lever and degree of steering movement, rendering the mechanism fool proof. The above described position of the valve parts is disclosed in Figure 8.

In order to positively return the axle to its normal transverse position, which has the effect of returning the vehicle's directional control back to straight ahead, it is merely necessary to return the control lever 76 to neutral. In this operation, the valve member 78 is rotated to its normal position, Figure 5. The pressure fluid is now fed directly into the communicating duct 84, thence into the central chamber 106 in the cut-off valve which has been rotated so that its duct 108 communicates with a duct 110 leading to the cylinder 58. The piston 62 is then forced downwardly to positively return the axle to normal, the oil in the cylinder 56 returning unimpeded to the sump via the duct 10, opening 102, duct 104 and opening 94. The valve 86 is returned to neutral during this movement. With the return of the pistons and valves to the neutral position, Figure 5, I again have the solid link, liquid seal condition holding the pistons stationary and simulating the rigid bracket connection 44 on the right spring. The motor 10 is thus reversible or double acting in its operation.

Under some conditions it may be desirable to hold the steering effect, whereupon the control lever 76 is moved from "turn left" to "turn left hold" position, Figure 1. The valvular parts are then in the position shown in Figure 9, the valve member 78 having been rotated sufficiently to seal off duct 89 from the source of fluid pressure. The almost complete liquid seal above the piston 60 thus serves to retain the piston and its interconnected parts in the "hold" position. A complete return of the control lever 76 to neutral breaks the "hold" position of the wheels and positively returns the same by power to straight ahead position in the manner heretofore described.

Figures 8, 9:
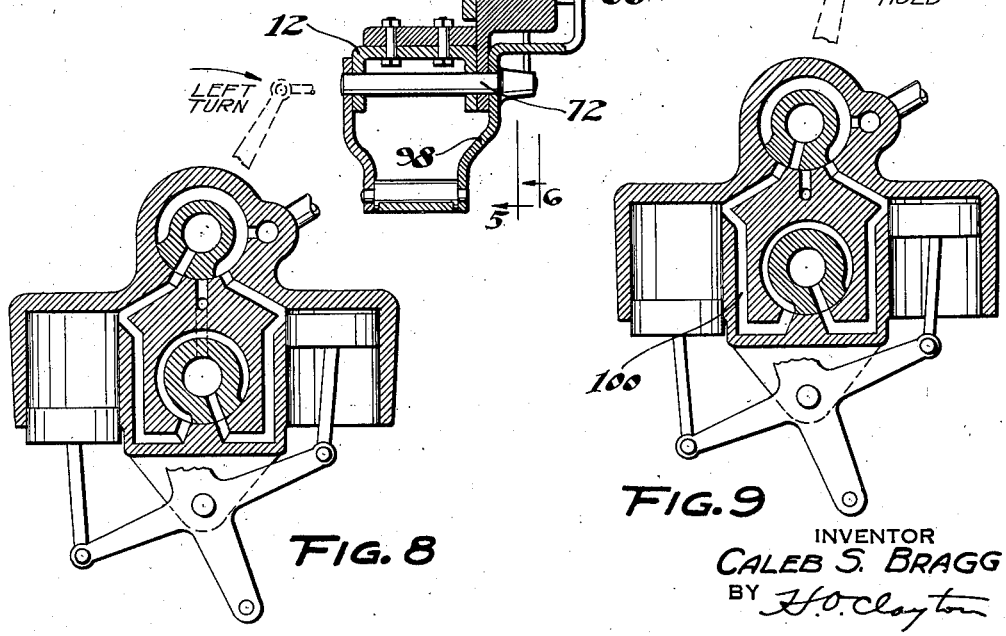
Figure 8 is a sectional view through the motor similar to Figure 5, showing the "left turn" position of the valvular parts.
Figure 9 is a view similar to Figure 8 showing the "left turn hold" position of the parts.

It is also to be noted that the valve 78 may be rotated to the "hold" position in point of time before the valve 86 has rotated sufficiently to uncover the duct 100. I then have, as shown in Figure 9, a complete seal of the piston 60 and a more rigid holding of the axle in its partially completed turn. By carefully timed manipulation of the valve member 78 the degree of rotation of the wheels can thus be determined. It is also to be noted, however, that the control valve 76 must be returned to "left turn" from the aforementioned lever position to increase the degree of turn of the wheels and that the complete throw of the piston which corresponds to the cut-off position of the valve 86 in Figure 9 must be had before the wheels can be returned as heretofore described.

With the dual motor control disclosed in Figure 10, the heretofore described motor 10 is duplicated on the right side rail of the chassis. Pipes 112 and 114 serve respectively to place the two motors in circuit with the return to sump and pressure fluid source, and a common actuating rod 116 serves to simultaneously crack the primary valves of the respective motors. The operation of the motors is as previously described and with the cracking of the control valves both vehicle springs are simultaneously moved forward or backward to effect the heretofore described steering effect.

There is thus provided a very effective, easily controlled power mechanism for steering the vehicle, the mechanism being entirely auxiliary to the conventional steering mechanism. The complete liquid seal of the motor or motors, with the latter in an inoperative or neutral position, serves to provide a rigid link or bracket connection between the rear end of the springs and the side rails; otherwise the mechanism for normal steering may be purely conventional and in fact may be of comparatively low steering ratio to permit the use of the more rugged type of mechanism, such as the worm and worm wheel. The auxiliary power mechanism of my invention takes care of situations wherein abnormal steering effort is demanded, which is ordinarily at the lowest vehicular speeds.

The invention is accordingly particularly effective when steering is desired with the vehicle at rest, although the mechanism may also be employed when the vehicle is in motion. A dexterous handling of the control lever will effect the desired change of direction of the steering wheels as well as the breaking of their frictional hold upon the ground. In carrying out the operation, the right hand of the operator may well be employed to actuate the control lever as the left hand lightly holds the steering wheel stationary. The "left turn" and "left turn hold" operations have been heretofore described but it is obvious that the reverse operation of the actuator will effect the "right turn" and "right turn hold" steering of the wheels.

The power of the actuator may be increased or decreased at will during the steering operation by merely increasing or decreasing the R. P. M. of the engine through the operation of the accelerator pedal or other throttle control. This action will, perforce, increase or decrease the time required to turn the wheels by virtue of the action of the oil pump of the engine lubricating system when and if this system is employed as the source of fluid pressure to operate the power steering actuator; however, other sources of controlled fluid pressure may be employed with equal facility.

The power actuator disclosed in this application and the control therefor is also disclosed and is claimed in my copending application Serial No. 3,716, filed January 28, 1935.

While a preferred embodiment of the invention is herein described, it is to be understood that this is given merely as a typical example of the effectuation of the underlying principles involved; and since these principles may be incorporated in other physical structures it is not intended to be limited to that described herein, except as such limitations are unequivocally imposed by the appended claims.

I claim:

1. In an automotive vehicle, the combination with the steering wheels and steering mechanism therefor of a front axle interconnected with said steering mechanism and constructed and arranged to be movable relative thereto, and means comprising a fluid power motor for imparting movement to said axle to effect steering movement of said wheels through the intermediary of said steering mechanism.

2. In an automotive vehicle, the combination with the steering wheels and steering mechanism therefor of a front axle mounted for pivotal movement relative to said vehicle, but normally maintained in fixed position relative thereto; means, including said steering mechanism and movable relative to said axle while the axle is fixed, for effecting steering movement; and means for imparting angular movement to said axle while said steering mechanism is fixed to thereby effect desired steering movement of the wheels.

3. In an automotive vehicle, the combination with the vehicle springs, steering wheels and steering mechanism for said wheels, of a front axle pivotally connected with at least one of said springs, said axle being connected to a part of said steering mechanism in such fashion as to be capable of actuating the same, means for actuating said steering mechanism while said axle is maintained fixed relative to the springs, together with means for imparting angular movement to said axle to thereby also effect desired steering movement of the wheels.

4. In an automotive vehicle, the combination with the front axle, interconnected steering wheels and steering mechanism for said wheels connected to said axle, said steering mechanism comprising a drag link, means for moving said drag link while said axle is maintained fixed for turning said steering wheels, of means for driving the axle with respect to the drag link to thereby impart relative movement between the two and incidentally also impart an operative movement to a portion of the steering mechanism.

5. In an automotive vehicle, the combination with the front axle, steering wheels and steering mechanism for said wheels connected to said axle, said steering mechanism comprising means capable of being held stationary, of means for driving the axle with respect to said aforementioned steering means when the latter is in its immovable condition to thereby impart relative movement between the axle and said stationary means and incidentally impart an operative movement to a portion of the steering mechanism.

6. In an automotive vehicle, the combination with the vehicle springs, front axle, interconnected steering wheels and steering mechanism for said wheels connected to said axle, said steering mechanism comprising a drag link, of means for moving the axle with respect to the drag link through the intermediary of at least one of said springs to thereby impart relative movement between the axle and drag link and incidentally impart an operative movement of a portion of the steering mechanism to effect the desired steering operation.

7. In an automotive vehicle, the combination with the vehicle springs, front axle, said axle being pivotally connected to at least one of said springs for angular movement relative thereto, steering wheels and steering mechanism for said wheels, connections between said steering mechanism and said axle, said steering mechanism comprising a drag link, of means for driving the axle with respect to the drag link through the intermediary of at least one of said springs to thereby impart relative movement between the axle and drag link and incidentally impart an operative movement to the remaining steering mechanism.

8. In an automotive vehicle, the combination with the vehicle springs, the front axle, steering wheels and steering mechanism for said wheels, connections between said axle and said steering mechanism, said mechanism comprising a drag link and irreversible driving means connected to said link, of power means for driving the axle with respect to the drag link through the intermediary of at least one of said springs to thereby impart relative movement between the link and axle and incidentally impart an operative movement to a portion of the steering mechanism.

9. In an automotive vehicle provided with chassis side rails, steering wheels, steering mechanism for said wheels interconnecting the same for synchronized movement, front supporting springs connected to said rails, a front axle connected to said springs, together with means mounted on at least one of said side rails for moving said axle with respect to said rails through the intermediary of at least one of said springs.

10. In an automotive vehicle provided with chassis side rails, steering wheels, steering mechanism for said wheels interconnecting the same for simultaneous movement, vehicle springs connected to said rails, a front axle connected to said springs and to said steering mechanism, together with means mounted on at least one of said side rails for moving said axle with respect to said rails through the intermediary of at least one of said springs to thereby impart movement to said steering mechanism through the intermediary of said driving axle.

11. In an automotive vehicle provided with chassis side rails, steering wheels, steering mechanism for said wheels interconnecting the same, a front axle supported by said steering wheels, front springs pivotally mounted on said axle, connections between said springs and said side rails, said connections comprising means mounted on at least one of said side rails for moving said axle with respect to said rails through the intermediary of at least one of said springs.

12. An automotive vehicle steering mechanism comprising, in combination with a chassis having side rails, chassis supporting springs and a front axle pivotally secured to said springs, together with power motors mounted, one on each side rail, said motors connected each to one of said springs to impart, when energized, bodily movement to said springs to thereby impart angular movement to said axle through the intermediary of said springs.

13. An automotive vehicle steering mechanism comprising, in combination with a chassis having side rails, chassis supporting springs and a front axle pivotally secured to said springs, together with power motors mounted, one on each side rail, each of said motors constructed and arranged to function as a means for interconnecting said springs with said side rails, said motors each being so connected to one of said springs as to impart, when energized, bodily movement to said springs and concomitantly impart angular movement to said axle.

14. An automotive vehicle steering mechanism comprising, in combination with a chassis having side rails, chassis supporting springs, means interconnecting at least one of said side rails and one of said springs comprising a fluid motor operable to impart relative movement between said side rail and spring as a means for steering the vehicle, said motor simulating a shackle when energized, but rigidly interconnecting the side rail and spring when inoperative.

15. In an automotive vehicle, a chassis comprising a side rail, a front axle, a chassis supporting spring, steering wheels, steering mechanism for said wheels comprising a drag link mounted adjacent said supporting spring and side rail, together with driving means adjacent to said spring and drag link, said driving means serving to impart through the intermediary of said spring movement to said axle with respect to said drag link.

16. In an automotive vehicle, a front axle, lever means pivoted on the end of said axle, a drag link pivotally secured to one end of said lever means, means for rendering said drag link immovable, together with means for imparting movement to said axle to thereby actuate said lever means about its connection with said immovable drag link as a fulcrum.

17. In an automotive vehicle, a front axle, lever means pivoted on the end of said axle, a drag link pivotally secured to one end of said lever means, means for rendering said drag link immovable, together with means for imparting bodily movement to said axle to thereby actuate said lever means about its connection with said immovable drag link as a fulcrum.

18. In an automotive vehicle, a front axle, lever means pivoted on the end of said axle, a drag link pivotally secured to the end of said lever means, means for rendering said drag link immovable, together with means for imparting angular movement to said axle to thereby actuate said lever means about its connection with said immovable drag link as a fulcrum.

19. In an automotive vehicle, a front axle, a left front spring pivotally mounted on said axle, together with means for imparting angular movement to said axle with respect to said spring about said pivotal connection as a fulcrum.

20. In an automotive vehicle, a front axle, a left front spring pivotally mounted on said axle, steering wheels for said vehicle, steering mechanism for said wheels, interconnected with said axle, together with means for imparting an angular movement to said axle with respect to said springs about its said pivotal connection as a fulcrum to thereby impart operative movement to said steering mechanism through its connection with said axle.

21. Steering mechanism for an automotive vehicle comprising the combination with a source of fluid pressure and power transmission linkage, said linkage including supporting means for the vehicle chassis of a fluid motor actuator comprising two separate motors, pistons in said motors, means interconnecting said pistons and said chassis supporting means, a manually operable valve for selectively interconnecting one or the other of said motors with said fluid pressure source to energize said motor and operate said supporting means to steer the vehicle.

22. Steering mechanism for an automotive vehicle comprising the combination with a source of fluid pressure and power transmission linkage, said linkage including supporting means for the vehicle chassis of a double acting fluid power actuator comprising two separate motors, pistons in said motors, means interconnecting said pistons and said chassis supporting means, a manually operable indexed valve for selectively interconnecting one or the other of said motors with said fluid pressure source to energize said motor and operate said power transmission linkage to steer the vehicle.

23. Steering mechanism for an automotive vehicle comprising the combination with a source of fluid pressure and power transmission linkage said linkage comprising a vehicle spring of a double acting fluid power actuator comprising two separate motors, pistons in said motors, means interconnecting said pistons and said spring, a manually operable indexed valve for selectively interconnecting one or the other of said motors with said fluid pressure source to energize said motor and operate said power transmission linkage, together with other valve means rendered operative by either of said motors for automatically rendering said motor inoperative after a predetermined movement of said transmission linkage.

24. Steering mechanism for an automotive vehicle comprising the combination with a source of fluid pressure and power transmission linkage said linkage comprising a vehicle spring of a fluid power actuator comprising two separate motors, pistons in said motors, means interconnecting said pistons and said vehicle spring together with valve means for controlling the operation of said motors, said valve means constructed and arranged to successively effect selective energization of either motor, automatic de-energization of the energized motor, selective fluid power retension of the static operative position of said power transmission linkage and lastly selective energization of the remaining motor to positively return said power transmission linkage to its inoperative position.

25. In an automotive vehicle comprising a chassis having channel sectioned side rails, a power actuator mounted on one of said rails and extending above the same, a lever member also mounted on said rail adjacent said actuators and extending below said rail together with common means securing said actuator and lever means to said side rail.

26. For an automotive vehicle, an axle, steering knuckles carried thereby, steering wheels pivotally mounted in said knuckles, steering arms for said steering wheels, a tie rod connecting said steering arms, a drag link connected to one of said steering arms, a hand wheel for operating said drag link, and additional means operated by power for turning said steering wheels, said additional means comprising a pivotal mounting for said axle and mechanism for turning said axle on said pivotal mounting.

CALEB S. BRAGG.